US010611370B2

(12) United States Patent
Ishii et al.

(10) Patent No.: US 10,611,370 B2
(45) Date of Patent: Apr. 7, 2020

(54) INFORMATION PROCESSING APPARATUS, INFORMATION PROCESSING METHOD, AND NON-TRANSITORY RECORDING MEDIUM

(71) Applicant: Panasonic Intellectual Property Corporation of America, Torrance, CA (US)

(72) Inventors: Yasunori Ishii, Osaka (JP); Ryota Fujimura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 185 days.

(21) Appl. No.: 15/879,908

(22) Filed: Jan. 25, 2018

(65) Prior Publication Data

US 2018/0222476 A1  Aug. 9, 2018

(30) Foreign Application Priority Data

Feb. 9, 2017 (JP) .................................. 2017-022641
Sep. 19, 2017 (JP) .................................. 2017-178640

(51) Int. Cl.
*B60W 30/09* (2012.01)
*B60W 30/095* (2012.01)
(Continued)

(52) U.S. Cl.
CPC ....... *B60W 30/095* (2013.01); *B60R 21/0134* (2013.01); *B60W 10/04* (2013.01);
(Continued)

(58) Field of Classification Search
CPC .... B60W 30/095; B60W 10/04; B60W 10/20; B60W 50/14; B60R 21/0134; G01S 13/931; G01S 17/936
(Continued)

(56) References Cited

U.S. PATENT DOCUMENTS 5,939,976 A   8/1999  Sasaki et al.
2007/0233351 A1*  10/2007  Wang .................. B60T 7/122
                                            701/70
(Continued)

FOREIGN PATENT DOCUMENTS

JP   2010-165021 A   7/2010
JP   2014-093040     5/2014

OTHER PUBLICATIONS

The Extended European Search Report dated Jul. 3, 2018 for the related European Patent Application No. 18155199.5.

*Primary Examiner* — Thomas G Black
*Assistant Examiner* — Wae L Louie
(74) *Attorney, Agent, or Firm* — Greenblum & Bernstein, P.L.C.

(57) ABSTRACT

An information processing apparatus mountable on a first moving body obtains second movement information including the position and velocity of a second moving body and first movement information including the position and velocity of the first moving body. A second predicted path is determined from the second movement information, and a first predicted path is determined from the first movement information. Then, the information processing apparatus generates travel assistance information including information for directing the first moving body to take a detour from the first predicted path in a direction corresponding to a difference between arrival time periods taken for the second moving body and the first moving body to reach an intersection point of the second predicted path and the first predicted path. Finally, the generated travel assistance information is output.

11 Claims, 10 Drawing Sheets

(51) Int. Cl.

| | | |
|---|---|---|
| B60R 21/0134 | (2006.01) | |
| B62D 15/02 | (2006.01) | |
| B60W 50/14 | (2020.01) | |
| G01S 13/931 | (2020.01) | |
| G01S 17/93 | (2020.01) | |
| B60W 10/20 | (2006.01) | |
| B60W 10/04 | (2006.01) | |
| G08G 1/16 | (2006.01) | |
| G06K 9/00 | (2006.01) | |
| B60W 30/18 | (2012.01) | |
| B60W 10/184 | (2012.01) | |
| B60R 21/0132 | (2006.01) | |
| B60W 10/18 | (2012.01) | |
| B60R 21/01 | (2006.01) | |

(52) U.S. Cl.
CPC .......... *B60W 10/184* (2013.01); *B60W 10/20* (2013.01); *B60W 30/18154* (2013.01); *B60W 50/14* (2013.01); *B62D 15/0265* (2013.01); *G01S 13/931* (2013.01); *G01S 17/936* (2013.01); *G06K 9/00791* (2013.01); *G08G 1/166* (2013.01); *B60R 2021/01013* (2013.01); *B60R 2021/01327* (2013.01); *B60W 10/18* (2013.01); *B60W 2420/52* (2013.01); *B60W 2550/10* (2013.01); *B60W 2550/30* (2013.01)

(58) Field of Classification Search
USPC .......................................................... 701/301
See application file for complete search history.

(56) References Cited

U.S. PATENT DOCUMENTS

| | | | |
|---|---|---|---|
| 2008/0065328 A1* | 3/2008 | Eidehall | G01S 7/295 701/301 |
| 2012/0101711 A1* | 4/2012 | Furmston | G01S 7/415 701/300 |
| 2012/0330541 A1* | 12/2012 | Sakugawa | B60W 30/095 701/301 |
| 2013/0253815 A1* | 9/2013 | Orfila | G08G 1/166 701/301 |
| 2015/0332114 A1* | 11/2015 | Springer | G06K 9/4604 348/148 |
| 2015/0344030 A1* | 12/2015 | Damerow | B60W 30/0956 701/1 |
| 2016/0046290 A1* | 2/2016 | Aharony | G06K 9/00798 701/41 |
| 2017/0329332 A1* | 11/2017 | Pilarski | B60W 50/0097 |
| 2018/0032082 A1* | 2/2018 | Shalev-Shwartz | B60W 30/0953 |
| 2018/0154889 A1* | 6/2018 | Minemura | B60T 7/12 |
| 2018/0222476 A1* | 8/2018 | Ishii | B60W 10/184 |

* cited by examiner

INFORMATION PROCESSING APPARATUS, INFORMATION PROCESSING METHOD, AND NON-TRANSITORY RECORDING MEDIUM

BACKGROUND

1. Technical Field

The present disclosure relates to an information processing apparatus mountable on a moving body, an information processing method, and a non-transitory recording medium.

2. Description of the Related Art

In the related art, a collision avoidance device is disclosed that allows a vehicle to avoid collision with a pedestrian (moving body) in a crosswalk across the path of travel of the vehicle (for example, Japanese Unexamined Patent Application Publication No. 2014-93040). Upon recognition that a pedestrian is crossing the roadway within the crosswalk, the vehicle decelerates or stops and can thus avoid collision with the pedestrian.

In Japanese Unexamined Patent Application Publication No. 2014-93040, however, the vehicle decelerates or stops to avoid collision, which may lead to a reduction in the evaluation of operations of the vehicle. For example, the vehicle decelerates or stops to avoid collision, which may cause the vehicle to delay reaching the destination, or the deceleration or stopping of the vehicle may annoy the passenger(s) of the vehicle, which may result in a reduction in the evaluation of operations of the vehicle.

SUMMARY

One non-limiting and exemplary embodiment provides an information processing apparatus and the like that can prevent or minimize a reduction in the evaluation of operations of a moving body while allowing the moving body to avoid collision.

In one general aspect, the techniques disclosed here feature an apparatus which is equipped in a first moving body. The apparatus includes a processor, a sensor, and a memory storing thereon a computer program, which when executed by the processor, causes the processor to perform operations including obtaining second movement information and first movement information that are based on information obtained from the sensor, the second movement information including a position and velocity of a second moving body, the first movement information including a position and velocity of the first moving body; generating travel assistance information including information for directing the first moving body to take a detour from a first predicted path in accordance with a difference between an arrival time period taken for the second moving body to reach an intersection point of a second predicted path and the first predicted path and an arrival time period taken for the first moving body to reach the intersection point, the first predicted path being determined from the first movement information, the second predicted path being determined from the second movement information; and outputting the generated travel assistance information.

In an information processing apparatus and the like according to aspects of the present disclosure, it may be possible to prevent or minimize a reduction in the evaluation of operations of a moving body while allowing the moving body to avoid collision.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
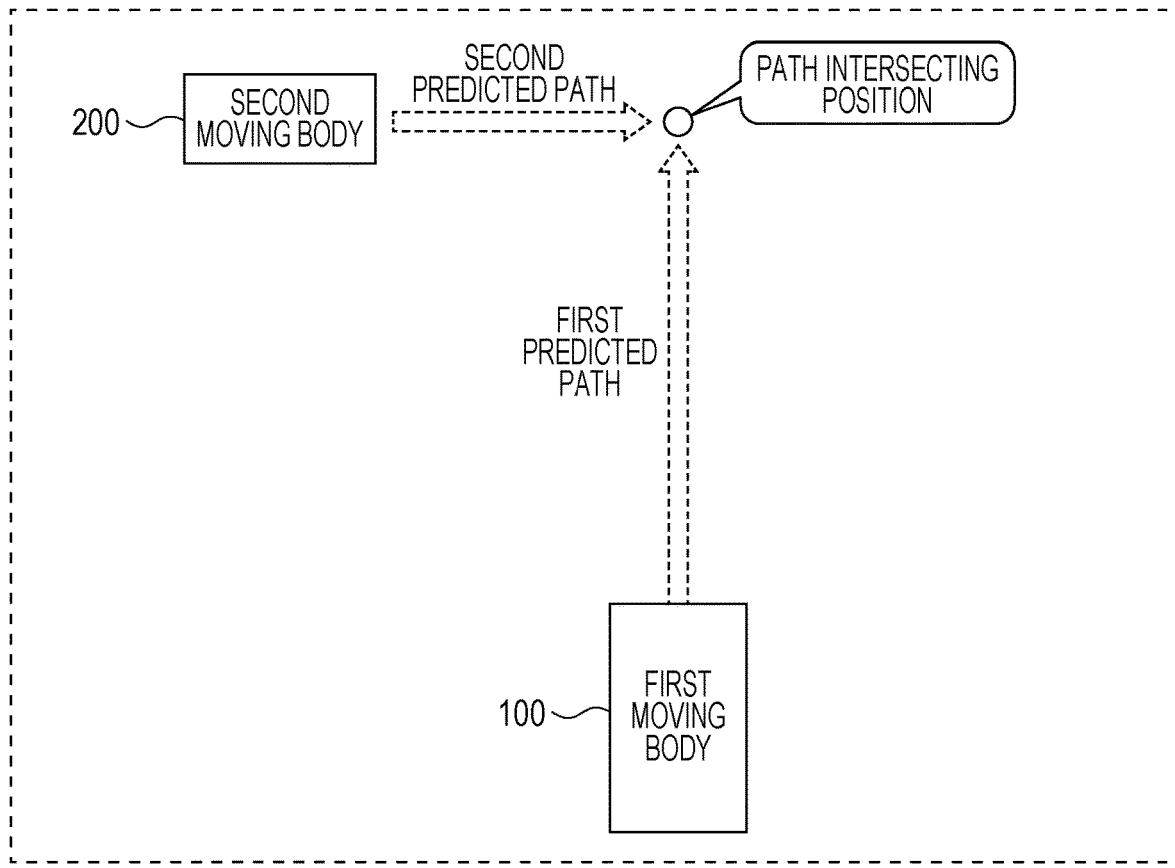
FIG. 1 is a diagram illustrating a situation in which a predicted movement path of a first moving body and a predicted movement path of a second moving body intersect.

FIG. 1 is a diagram illustrating a situation in which a predicted movement path of a first moving body 100 and a predicted movement path of a second moving body 200 intersect. In the illustration, for example, the second moving body 200 is moving from the left side ahead (in the direction of movement) of the first moving body 100 and approaching the path of travel of the first moving body 100. If the first moving body 100 and the second moving body 200 move while keeping their current directions of movement, the first moving body 100 and the second moving body 200 may collide with each other at the position at which the predicted movement paths intersect (hereinafter referred to as the path intersecting position). The first moving body 100 or the second moving body 200 usually decelerates or stops to avoid collision. The deceleration or stopping of a moving body may cause the moving body to delay reaching the destination or may annoy the passenger(s) of the moving body, which may result in a reduction in the evaluation of operations of the moving body. Accordingly, an embodiment of the present disclosure may provide an information processing apparatus that can prevent or minimize a reduction in the evaluation of operations of a moving body while allowing the moving body to avoid collision.

In the present disclosure, the first moving body 100 and the second moving body 200 are described as vehicles. However, the first moving body 100 and the second moving body 200 may not necessarily be vehicles. The first moving body 100 may be an aircraft or a ship, for example. The second moving body 200 may be a person, an aircraft, or a ship, for example. The term "vehicle", as used herein, refers to a motor vehicle or a bike, for example, and the term "aircraft" is used to include, for example, an unmanned aircraft such as an unmanned aerial vehicle.

An apparatus according to an aspect of the present disclosure is equipped in a first moving body. The apparatus includes a processor, a sensor, and a memory storing thereon a computer program, which when executed by the processor, causes the processor to perform operations including obtaining second movement information and first movement information that are based on information obtained from the sensor, the second movement information including a position and velocity of a second moving body, the first movement information including a position and velocity of the first moving body; generating travel assistance information including information for directing the first moving body to take a detour from a first predicted path in accordance with a difference between an arrival time period taken for the second moving body to reach an intersection point of a second predicted path and the first predicted path and an arrival time period taken for the first moving body to reach the intersection point, the first predicted path being determined from the first movement information, the second predicted path being determined from the second movement information; and outputting the generated travel assistance information.

With this configuration, the first moving body takes a detour from the first predicted path and travels in the direction corresponding to the difference between arrival time periods taken for the first and second moving bodies to reach the intersection point of the second predicted path determined from the second movement information and the first predicted path determined from the first movement information (the path intersecting position) to avoid collision. In accordance with the difference between the arrival time periods, the first moving body crosses the path in the direction of movement of the second moving body (ahead of the second moving body) or the path in the opposite direction (behind the second moving body). As a result, the distance between the first moving body, when crossing the movement path of the second moving body, and the second moving body increases, which may enable the first moving body to safely avoid collision without decelerating or stopping. Accordingly, it may be possible to prevent or minimize a reduction in the evaluation of operations of a moving body while allowing the moving body to avoid collision.

Additionally or alternatively, the travel assistance information may include information for directing the first moving body to take a detour and travel in a direction of movement of the second moving body when the arrival time period taken for the first moving body to reach the intersection point is less than the arrival time period taken for the second moving body to reach the intersection point.

With this configuration, if the first moving body is predicted to reach the path intersecting position earlier than the second moving body on the basis of the first movement information and the second movement information, the first moving body crosses the path ahead of the second moving body while preventing deceleration or stopping to avoid collision.

Additionally or alternatively, the travel assistance information may include information for directing the first moving body to take a detour and travel in a direction opposite to the direction of movement of the second moving body when the arrival time period taken for the first moving body to reach the intersection point is more than the arrival time period taken for the second moving body to reach the intersection point.

With this configuration, if the second moving body is predicted to reach the path intersecting position earlier than the first moving body on the basis of the first movement information and the second movement information, the first moving body crosses the path behind the second moving body while preventing deceleration or stopping to avoid collision.

The travel assistance information may further include information for directing the first moving body to make a detour and travel at a speed corresponding to the difference between the arrival time periods. Specifically, the speed corresponding to the difference between the arrival time periods may be a speed that is increased or decreased by the difference between the arrival time periods compared with a speed of the first moving body before the first moving body takes the detour.

With this configuration, if the first moving body is predicted to reach the path intersecting position earlier than the second moving body, the first moving body takes a detour and travels at a speed that is increased compared with before taking the detour, which enables the first moving body to cross further ahead of the second moving body when the first moving body crosses the movement path of the second moving body. If the second moving body is predicted to reach the path intersecting position earlier than the first moving body, the first moving body takes a detour and travels at a speed that is decreased compared with before taking the detour, which enables the first moving body to cross further behind the second moving body when the first moving body crosses the movement path of the second moving body. As a result, the distance between the first moving body and the second moving body increases when the first moving body crosses the movement path of the second moving body, which enables the first moving body to more safely avoid collision with the second moving body.

The travel assistance information may further include information for directing the first moving body to decelerate or stop when the difference between the arrival time period taken for the first moving body to reach the intersection point and the arrival time period taken for the second moving body to reach the intersection point is less than or equal to a predetermined threshold.

With this configuration, if the difference between the arrival time periods taken for the first and second moving bodies to reach the path intersecting position is less than or equal to a predetermined threshold, for example, when the first moving body is predicted to reach the path intersecting position substantially at the same time as the second moving body, the first moving body decelerates or stops and is thus able to avoid collision.

The travel assistance information may be information for controlling travel of the first moving body.

With this configuration, it may be possible to control the travel of the first moving body (to determine whether to turn right or left to take a detour) in accordance with the difference between the arrival time periods taken for the first and second moving bodies to reach the path intersecting position.

Alternatively, the travel assistance information may be information for informing a passenger of the first moving body of how travel of the first moving body is controlled.

With this configuration, a passenger of the first moving body can be informed how the travel of the first moving body is controlled (to determine whether to turn right or left to take a detour) in accordance with the difference between the arrival time periods taken for the first and second moving bodies to reach the path intersecting position.

Additionally or alternatively, the travel assistance information may include information for directing the first moving body to take a detour and travel in a direction that is angled by an amount corresponding to the difference between the arrival time periods with respect to a direction in which the first moving body travels before taking the detour.

With this configuration, the first moving body takes a detour and travels in a direction changed (or angled) from the direction in which the first moving body travels before taking the detour such that the amount of change in the direction increases as the difference between the arrival time periods decreases. As a result, if the difference between the arrival time periods is small, the distance between the first moving body and the second moving body increases when the first moving body crosses the movement path of the second moving body, which enables the first moving body to more safely avoid collision with the second moving body.

A non-transitory recording medium according to another aspect of the present disclosure stores thereon a computer program for controlling an apparatus equipped in a first moving body, which when executed by a processor, causes the processor to perform operations including obtaining second movement information and first movement information that are based on information obtained from a sensor, the second movement information including a position and velocity of a second moving body, the first movement information including a position and velocity of the first moving body; generating travel assistance information including information for directing the first moving body to take a detour from a first predicted path in accordance with a difference between an arrival time period taken for the second moving body to reach an intersection point of a second predicted path and the first predicted path and an arrival time period taken for the first moving body to reach the intersection point, the first predicted path being determined from the first movement information, the second predicted path being determined from the second movement information; and outputting the generated travel assistance information.

Accordingly, it may be possible to provide a non-transitory recording medium storing thereon a computer program that can prevent or minimize a reduction in the evaluation of operations of a moving body while allowing the moving body to avoid collision.

A method according to still another aspect of the present disclosure is a method for controlling an apparatus equipped in a first moving body. The method includes obtaining second movement information and first movement information that are based on information obtained from a sensor, the second movement information including a position and velocity of a second moving body, the first movement information including a position and velocity of the first moving body; generating travel assistance information including information for directing the first moving body to take a detour from a first predicted path in accordance with a difference between an arrival time period taken for the second moving body to reach an intersection point of a second predicted path and the first predicted path and an arrival time period taken for the first moving body to reach the intersection point, the first predicted path being determined from the first movement information, the second predicted path being determined from the second movement information; and outputting the generated travel assistance information.

Accordingly, it may be possible to provide a method that can prevent or minimize a reduction in the evaluation of operations of a moving body while allowing the moving body to avoid collision.

Embodiments will be specifically described with reference to the drawings.

It should be noted that the following embodiments are general or specific examples. Numerical values, shapes, constituent elements, arranged positions and connection forms of the constituent elements, steps, the order of the steps, and so on in the following embodiments are merely examples and are not intended to limit the present disclosure. The constituent elements mentioned in the following embodiments are described as optional constituent elements unless they are specified in the independent claim that defines the present disclosure in its broadest concept.

First Embodiment

In the following, a first embodiment will be described with reference to FIGS. 2 to 9.

1-1. Configuration of Information Processing Apparatus

Figure 2:
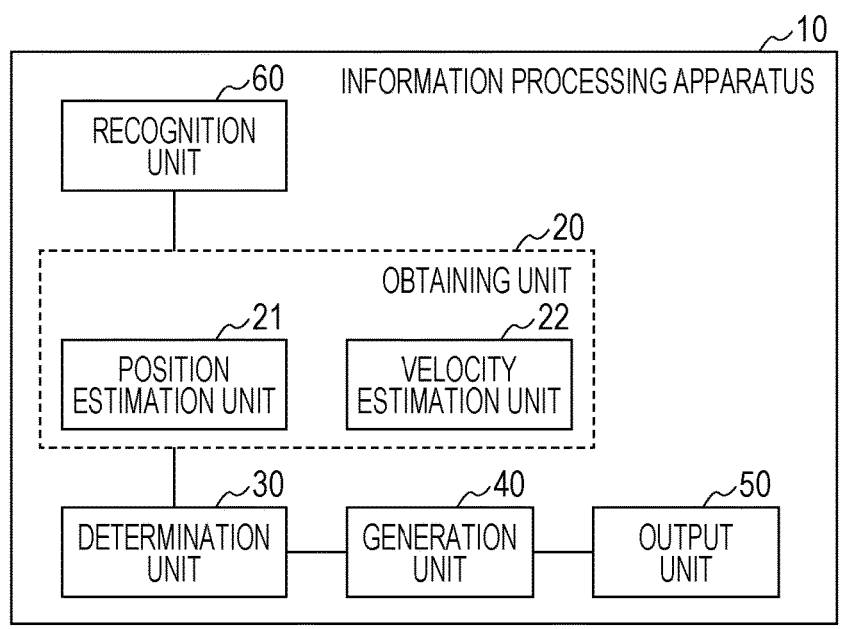
FIG. 2 is a block diagram illustrating an example configuration of an information processing apparatus according to a first embodiment.

FIG. 2 is a block diagram illustrating an example configuration of an information processing apparatus 10 according to a first embodiment.

The information processing apparatus 10 is mounted on the first moving body 100 and is constituted by, for example, a single electronic control unit (ECU) or a plurality of ECUs connected over an in-vehicle network. The information processing apparatus 10 generates travel assistance information on the basis of sensing results obtained from a camera (sensors) or the like, controls the engine, brakes, steering wheel, and so on by using control information as the travel assistance information, and presents the travel assistance information, namely, image information or audio information, through a display, speakers, or any other suitable device. The information processing apparatus 10 includes an obtaining unit 20, a determination unit 30, a generation unit 40, an output unit 50, and a recognition unit 60.

The obtaining unit 20 obtains second movement information including the position and velocity of the second moving body 200 and first movement information including the position and velocity of the first moving body 100. The first movement information and the second movement information are based on information obtained from the sensors. The term "velocity" refers to a vector quantity indicating the change in displacement of a moving particle per unit time and the direction of the displacement. For example, the obtaining unit 20 obtains position information of the first moving body 100 at intervals of a predetermined time period from a Global Positioning System (GPS) sensor mounted on the first moving body 100 to obtain the position and velocity of the first moving body 100. Since the position and velocity of the first moving body 100 may be the relative position and velocity of the first moving body 100 with respect to the position and velocity of the second moving body 200, the obtaining unit 20 may obtain the position and velocity of the first moving body 100 on the basis of information obtained by sensors such as cameras or radars or Light Detection and Ranging or Laser Imaging Detection and Ranging (LIDAR) devices. The obtaining unit 20 obtains, as the position of the first moving body 100, for example, the position of the front end of the first moving body 100 and the position of the rear end of the first moving body 100. The obtaining unit 20 may obtain the rotational speed and gear ratio of the engine from an engine-related ECU of the first moving body 100 to improve the accuracy of the obtained velocity of the first moving body 100 or may obtain information on the wheel speed from an ECU related to wheel speed sensors. The obtaining unit 20 includes a position estimation unit 21 and a velocity estimation unit 22 to obtain second movement information. The position estimation unit 21 estimates the position of the second moving body 200, and the velocity estimation unit 22 estimates the velocity of the second moving body 200. The operation of the obtaining unit 20 will be described below in more detail with reference to FIG. 3.

The determination unit 30 determines the relationship between arrival time periods taken for the second moving body 200 and the first moving body 100 to reach an intersection point of a second predicted path determined from the second movement information and a first predicted path determined from the first movement information (the path intersecting position). The term "predicted path" refers to a path from the current position that is predicted when the current direction of movement is maintained. As illustrated in FIG. 1, for example, the predicted path of each moving body is a straight-line path.

The generation unit 40 generates travel assistance information. The travel assistance information includes information for directing the first moving body 100 to take a detour and travel in a direction corresponding to a difference between the arrival time periods taken for the second moving body 200 and the first moving body 100 to reach the intersection point (the path intersecting position).

For example, if the arrival time period taken for the first moving body 100 to reach the intersection point (the path intersecting position) is less than the arrival time period taken for the second moving body 200 to reach the intersection point (the path intersecting position), the travel assistance information includes information for directing the first moving body 100 to take a detour and travel in the direction of movement of the second moving body 200 as the direction corresponding to the difference between the arrival time periods. If the arrival time period taken for the first moving body 100 to reach the intersection point (the path intersecting position) is more than the arrival time period taken for the second moving body 200 to reach the intersection point (the path intersecting position), the travel assistance information includes information for directing the first moving body 100 to take a detour and travel in a direction opposite to the direction of movement of the second moving body 200 as the direction corresponding to the difference between the arrival time periods.

Further, the direction corresponding to the difference between the arrival time periods is a direction that is angled by an amount corresponding to the difference between the arrival time periods with respect to the direction in which the first moving body 100 travels before taking the detour. For example, the first moving body 100 takes a detour and travels in a direction changed (or angled) from the direction of the predicted path illustrated in FIG. 1 such that the amount of change in the direction decreases as the difference between the arrival time periods increases and the amount of change in the direction increases as the difference between the arrival time periods decreases.

For example, the travel assistance information further includes information for directing the first moving body 100 to take a detour from the first predicted path at a speed corresponding to the difference between the arrival time periods, and the speed corresponding to the difference between the arrival time periods is a speed that is increased or decreased compared with the speed of the first moving body 100 before taking the detour. The term "speed" is a scalar quantity indicating the magnitude of velocity.

For example, if the arrival time period taken for the first moving body 100 to reach the intersection point (the path intersecting position) is equal to the arrival time period taken for the second moving body 200 to reach the intersection point (the path intersecting position), the travel assistance information includes information for directing the first moving body 100 to decelerate or stop.

In this embodiment, the travel assistance information described above is information for controlling the travel (such as detour, acceleration, or deceleration) of the first moving body 100. The detour may be a turn or a slide in a direction crossing the direction of travel.

The output unit 50 outputs the travel assistance information generated by the generation unit 40. For example, the output unit 50, which may be a chassis ECU for controlling vehicular behaviors or the like such as "taking a detour" or "coming to a stop", is connected to the steering wheel, engine, brakes, and so on and outputs the travel assistance information to the steering wheel, engine, brakes, and so on.

The recognition unit 60 recognizes the presence of the second moving body 200 by using information obtained from a sensor mounted on the first moving body 100. Non-limiting examples of the sensor include a camera, a radar, and a LIDAR device. When the sensor is a camera, the recognition unit 60 recognizes the presence of the second moving body 200 by using an image obtained by the camera. When the sensor is a LIDAR device or any other sensor, the recognition unit 60 recognizes the presence of the second moving body 200 by using point group data having information on the direction and distance to the first moving body 100, which is obtained from the LIDAR device or the like.

Each ECU is a device including digital circuits such as a processor (microprocessor) and a memory, analog circuits, a communication circuit, and so on. The memory, such as a read-only memory (ROM) or a random access memory (RAM), is capable of storing a control program (computer program) to be executed by the processor. For example, the processor operates in accordance with the control program (computer program), thereby allowing the information processing apparatus 10 to implement various functions (the obtaining unit 20, the determination unit 30, the generation unit 40, the output unit 50, and the recognition unit 60).

1-2. Operation of Information Processing Apparatus

Next, the operation of the information processing apparatus 10 will be described with reference to FIGS. 3 to 9.

Figure 3:
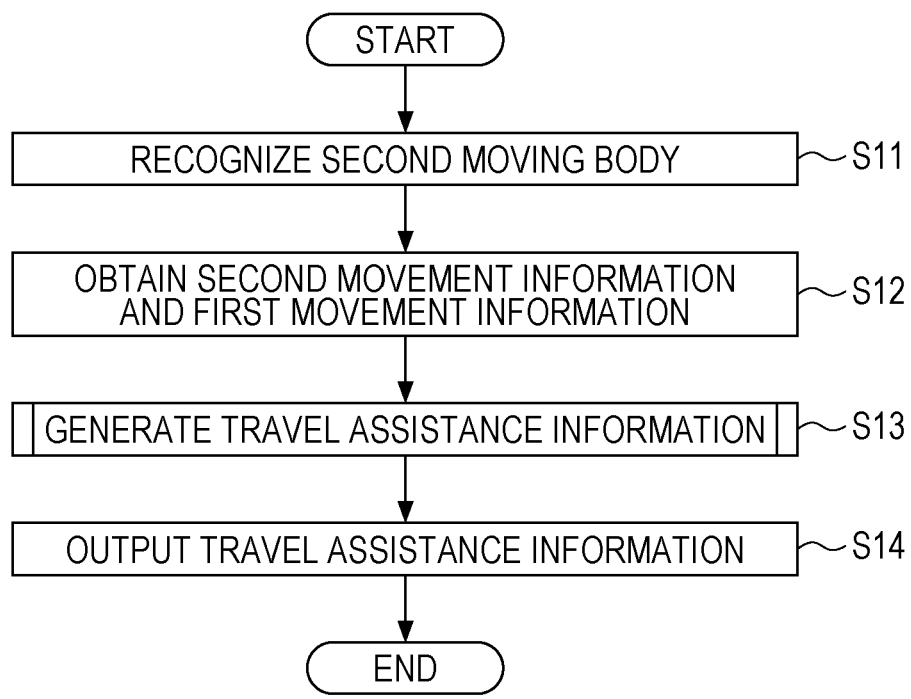
FIG. 3 is a flowchart illustrating an example operation of the information processing apparatus according to the first embodiment.

FIG. 3 is a flowchart illustrating an example operation of the information processing apparatus 10 according to the first embodiment.

First, the recognition unit 60 recognizes the presence of the second moving body 200. The recognition unit 60 performs image recognition on an image obtained from a camera or analyzes point group data obtained from a LIDAR device or the like to recognize the presence of the second moving body 200. When performing image recognition on the image obtained from the camera, the recognition unit 60 may recognize the attributes of the second moving body 200 through the image recognition. For example, the recognition unit 60 may recognize the type of the second moving body 200 (such as a motor vehicle, a bike, or a person). When the second moving body 200 is a person, the recognition unit 60 may further recognize that the second moving body 200 is a child, an adult, or an elderly person.

Then, the obtaining unit 20 obtains second movement information and first movement information (step S12). The processing of step S12 will be described in detail with reference to FIG. 4.

Figure 4:
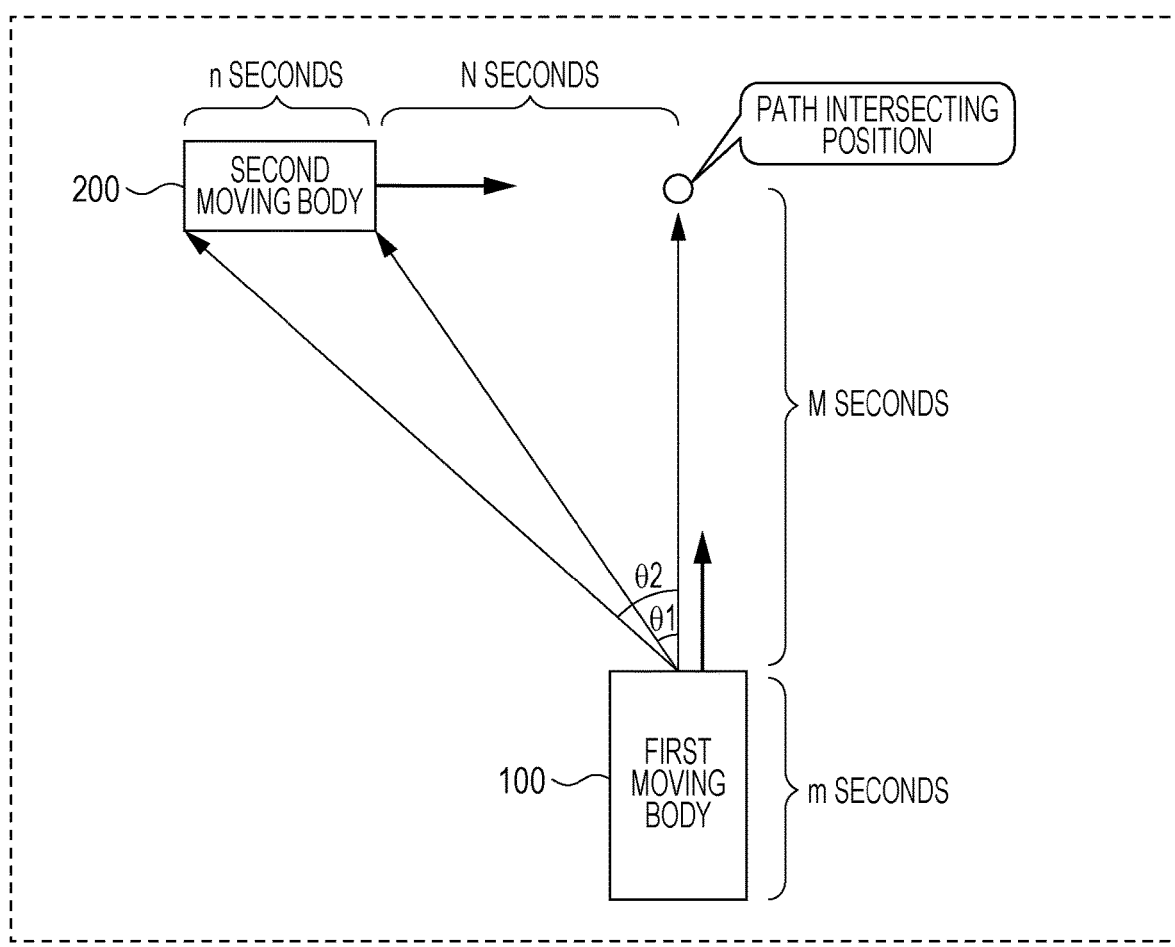
FIG. 4 is a diagram used to describe movement information according to the first embodiment.

FIG. 4 is a diagram used to describe movement information according to the first embodiment.

The obtaining unit 20 obtains first movement information including the position and velocity of the first moving body 100 in the way described above. The first movement information is information on the first moving body 100 (the information processing apparatus 10), which is associated with the first moving body 100, and may be obtained by using any method. As described above, the obtaining unit 20 further obtains, as the position of the first moving body 100, for example, the position of the front end of the first moving body 100 and the position of the rear end of the first moving body 100.

The obtaining unit 20 also obtains second movement information in response to the position estimation unit 21 and the velocity estimation unit 22 estimating the position and velocity of the second moving body 200.

For example, the position estimation unit 21 analyzes images obtained from a camera or point group data obtained from a LIDAR device or the like to estimate the position of the second moving body 200 relative to the first moving body 100 on the images or in three-dimensional space. Specifically, the position estimation unit 21 estimates, as the position of the second moving body 200, the distance between the front end of the first moving body 100 (the position at which a camera or a LIDAR device or the like is disposed) and the front end of the second moving body 200 and the distance between the front end of the first moving body 100 and the rear end of the second moving body 200. The position estimation unit 21 further estimates an angle $\theta 1$ and an angle $\theta 2$. The angle $\theta 1$ is formed between the direction of movement of the first moving body 100 and a direction from the first moving body 100 to the front end of the second moving body 200. The angle $\theta 2$ is formed between the direction of movement of the first moving body 100 and a direction from the first moving body 100 to the rear end of the second moving body 200. The velocity estimation unit 22 estimates the velocity of the second moving body 200 on the basis of the frame rate of the camera and on the basis of a change in the position of the second moving body 200 appearing in images of individual frames obtained by the camera or a change in the point group data obtained from the LIDAR device or the like.

The obtaining unit 20 further obtains a time period (referred to as a second arrival time period) taken for the second moving body 200 to reach an intersection point of the second predicted path determined from the second movement information and the first predicted path determined from the first movement information (the path intersecting position) and a time period (referred to as a first arrival time period) taken for the first moving body 100 to reach the intersection point (the path intersecting position).

The first arrival time period is a time period (M seconds illustrated in FIG. 4) obtained by, for example, dividing the distance between the front end of the first moving body 100 and the front end of the second moving body 200 and a distance between the front end of the first moving body 100 and the path intersecting position, which is calculated from the angle $\theta 1$, by the velocity of the first moving body 100. When the obtaining unit 20 (the information processing apparatus 10) has recognized the length of the first moving body 100 in advance, the first arrival time period may include a time period (m seconds illustrated in FIG. 4) obtained by dividing the length of the first moving body 100 by the velocity of the first moving body 100. That is, the first arrival time period may be M seconds or may be (M+m) seconds. Alternatively, the first arrival time period may be a time period obtained by dividing the distance between the center of the first moving body 100 and the path intersecting position by the velocity of the first moving body 100, i.e., (M+0.5 m) seconds. Alternatively, the length of the first moving body 100 may not be taken into account and m may be regarded as 0.

The second arrival time period is a time period (N seconds illustrated in FIG. 4) obtained by, for example, dividing the distance between the front end of the first moving body 100 and the front end of the second moving body 200 and a distance between the front end of the second moving body 200 and the path intersecting position, which is calculated from the angle $\theta 1$, by the velocity of the second moving body 200. The obtaining unit 20, which has obtained the position of the front end of the second moving body 200 and the position of the rear end of the second moving body 200, can calculate the length of the second moving body 200. The second arrival time period may include a time period (n seconds illustrated in FIG. 4) obtained by dividing the length of the second moving body 200 by the velocity of the second moving body 200. That is, the second arrival time period may be N second or may be (N+n) seconds. Alternatively, the second arrival time period may be a time period obtained by dividing the distance between the center of the second moving body 200 and the path intersecting position by the velocity of the second moving body 200, i.e., (N+0.5 n) seconds. Alternatively, when the second moving body 200 has a small length (width), such as when the second moving body 200 is a person, n may be regarded as 0.

In the way described above, the obtaining unit 20 obtains the first arrival time period and the second arrival time period.

Then, the generation unit 40 generates travel assistance information including information for directing the first moving body 100 to take a detour from the first predicted path and travel in the direction corresponding to the difference between the arrival time periods taken for the second moving body 200 and the first moving body 100 to reach the path intersecting position (step S13), and the output unit 50 outputs the generated travel assistance information (step S14). The processing of steps S13 and S14 will be described in detail with reference to FIGS. 5 to 8.

Figure 5:
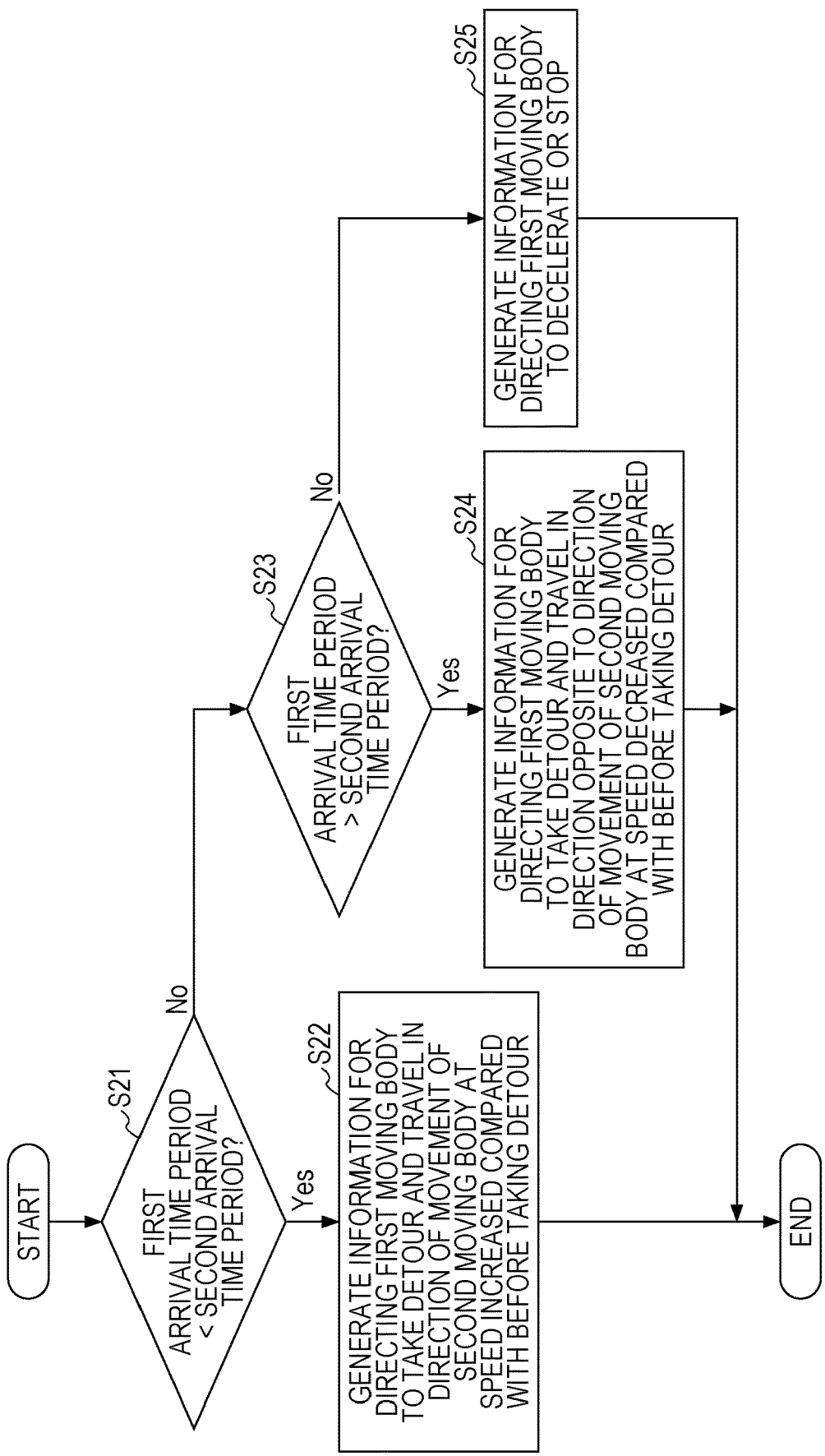
FIG. 5 is a flowchart illustrating an example operation of a generation unit and a determination unit according to the first embodiment.

FIG. 5 is a flowchart illustrating an example operation of the generation unit 40 and the determination unit 30 according to the first embodiment, and illustrates the details of the processing of step S13.

First, the determination unit 30 determines whether the first arrival time period is less than the second arrival time period (step S21). For example, the determination unit 30 determines whether a period of (M+m) seconds as the first arrival time period is less than a period of N seconds as the second arrival time period. If a period of (M+m) seconds is less than a period of N seconds, this means that the second moving body 200 has not reached the path intersecting position when the first moving body 100 passes through the path intersecting position. That is, if a period of (M+m) seconds is more than a period of N seconds, the second moving body 200 may collide with the side of the first moving body 100. Accordingly, the determination unit 30 can determine whether the second moving body 200 collides with the side of the first moving body 100.

If the determination unit 30 determines that the first arrival time period is less than the second arrival time period (Yes in step S21), the generation unit 40 generates travel assistance information including information for directing the first moving body 100 to take a detour and travel in the direction of movement of the second moving body 200 as the direction corresponding to the difference between the arrival time periods at a speed that is increased compared with the speed of the first moving body 100 before taking the detour (step S22), and the output unit 50 outputs the travel assistance information.

Figure 6:
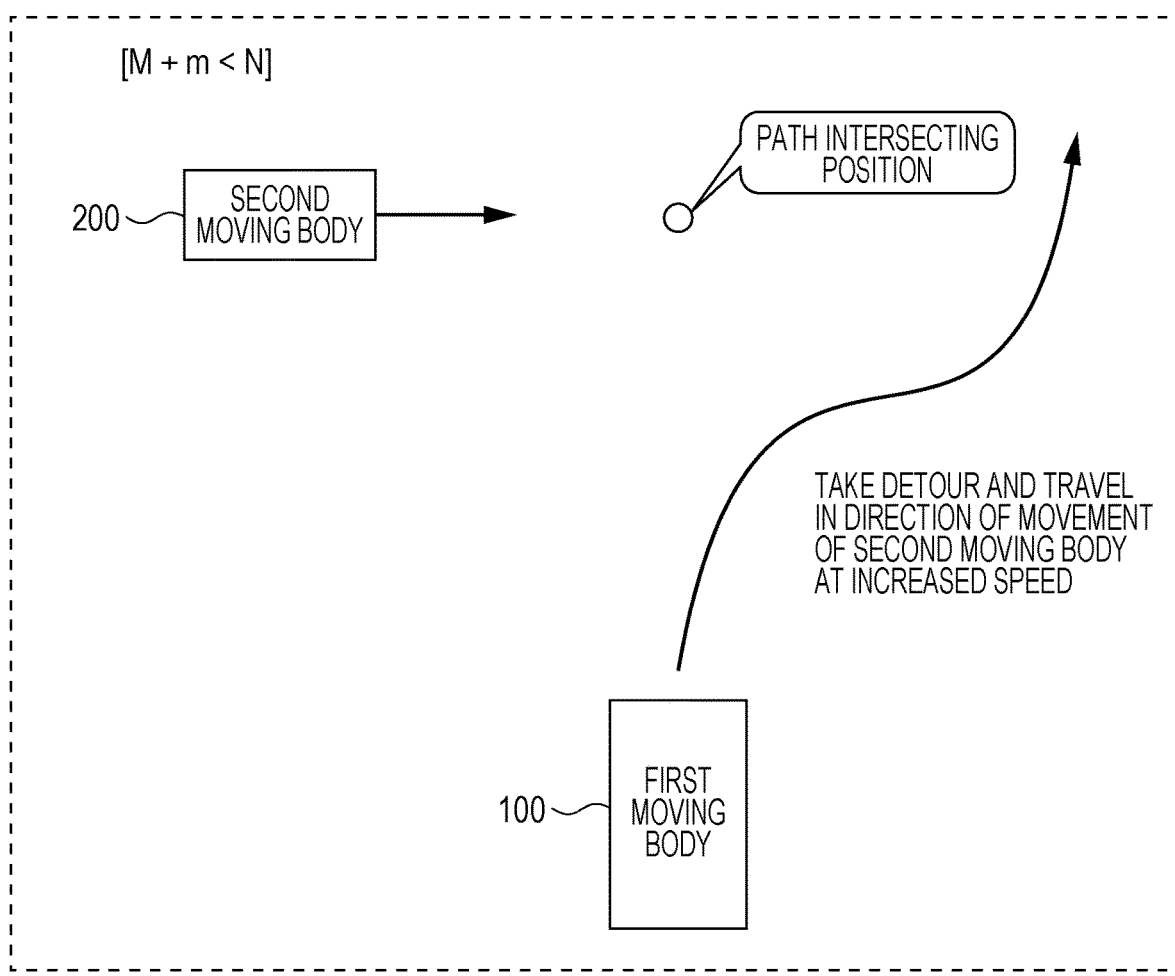
FIG. 6 is a diagram illustrating an example of collision avoidance when a first arrival time period is less than a second arrival time period.

FIG. 6 is a diagram illustrating an example of collision avoidance when the first arrival time period is less than the second arrival time period.

Even if the determination unit 30 determines that the first arrival time period is less than the second arrival time period, the second moving body 200 can rapidly accelerate, which may cause collision between the first moving body 100 and the second moving body 200 (cause the second moving body 200 to collide with the first moving body 100). Thus, as illustrated in FIG. 6, the first moving body 100 takes a detour and travels in the direction of movement of the second moving body 200 on the basis of the travel assistance information output from the output unit 50. As a result, the distance between the first moving body 100, when crossing the movement path of the second moving body 200, and the second moving body 200 increases, which enables the first moving body 100 to safely cross ahead of the second moving body 200. In addition, the first moving body 100 takes a detour and travels in the direction of movement of the second moving body 200 at a speed that is increased compared with the speed of the first moving body 100 before taking the detour on the basis of the travel assistance information. As a result, the distance between the first moving body 100, when crossing the movement path of the second moving body 200, and the second moving body 200 further increases, which enables the first moving body 100 to safely cross further ahead of the second moving body 200. When the difference between the first arrival time period and the second arrival time period is small, the first moving body 100 takes a detour and travels in a direction that is angled by a larger degree with respect to the direction in which the first moving body 100 travels before taking the detour. As a result, the distance between the first moving body 100, when crossing the movement path of the second moving body 200, and the second moving body 200 further increases, which enables the first moving body 100 to safely cross further ahead of the second moving body 200.

When the first arrival time period is less than the second arrival time period, the first arrival time period may be less than a time period obtained by subtracting a predetermined time period from the second arrival time period. For example, when the first arrival time period is less than the second arrival time period, a period of (M+m) seconds may be less than a period of (N−a) seconds, where a denotes a predetermined time period. As a result, the distance between the first moving body 100, when crossing the movement path of the second moving body 200, and the second moving body 200 increases by an amount corresponding to the predetermined time period, which enables the first moving body 100 to safely cross further ahead of the second moving body 200.

If the determination unit 30 does not determine that the first arrival time period is less than the second arrival time period (No in step S21), the determination unit 30 determines whether the first arrival time period is more than the second arrival time period (step S23). For example, the determination unit 30 determines whether a period of M seconds as the first arrival time period is more than a period of (N+n) seconds as the second arrival time period. If a period of M seconds is more than a period of (N+n) seconds, this means that the first moving body 100 has not reached the path intersecting position when the second moving body 200 passes through the path intersecting position. That is, if a period of M seconds is less than a period of (N+n) seconds, the first moving body 100 may collide with the side of the second moving body 200. Accordingly, the determination unit 30 can determine whether the first moving body 100 collides with the side of the second moving body 200.

If the determination unit 30 determines that the first arrival time period is more than the second arrival time period (Yes in step S23), the generation unit 40 generates travel assistance information including information for directing the first moving body 100 to take a detour and travel in a direction opposite to the direction of movement of the second moving body 200 as the direction corresponding to the difference between the arrival time periods at a speed that is decreased compared with the speed of the first moving body 100 before taking the detour (step S24), and the output unit 50 outputs the travel assistance information.

Figure 7:
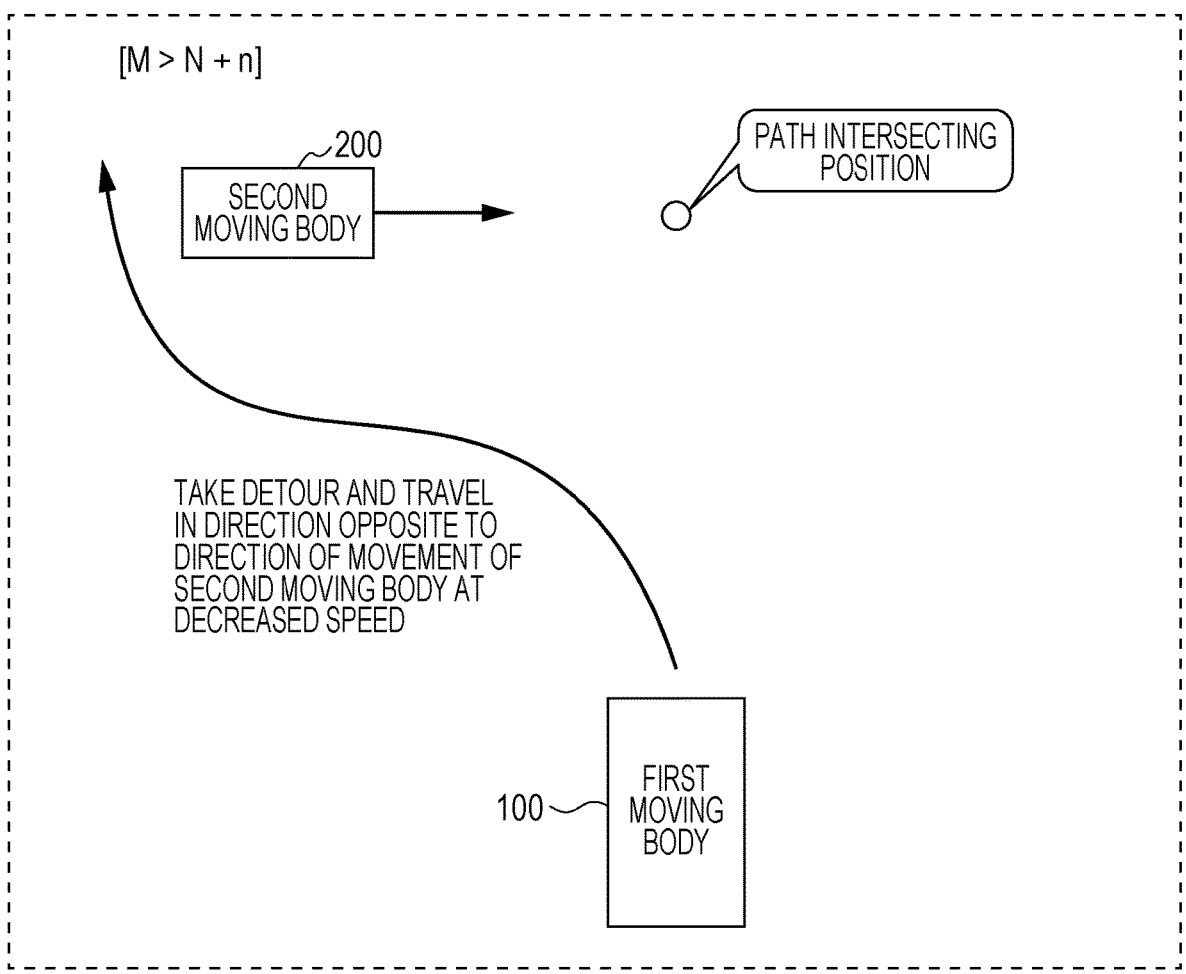
FIG. 7 is a diagram illustrating an example of collision avoidance when the first arrival time period is more than the second arrival time period.

FIG. 7 is a diagram illustrating an example of collision avoidance when the first arrival time period is more than the second arrival time period.

Even if the determination unit 30 determines that the first arrival time period is more than the second arrival time period, the second moving body 200 can rapidly decelerate, which may cause collision between the first moving body 100 and the second moving body 200 (cause the first moving body 100 to collide with the second moving body 200). Thus, as illustrated in FIG. 7, the first moving body 100 takes a detour and travels in a direction opposite to the direction of movement of the second moving body 200 on the basis of the travel assistance information output from the output unit 50. As a result, the distance between the first moving body 100, when crossing the movement path of the second moving body 200, and the second moving body 200 increases, which enables the first moving body 100 to safely cross behind the second moving body 200. In addition, the first moving body 100 takes a detour and travels in a direction opposite to the direction of movement of the second moving body 200 at a speed that is decreased compared with the speed of the first moving body 100 before taking the detour on the basis of the travel assistance information. As a result, the distance between the first moving body 100, when crossing the movement path of the second moving body 200, and the second moving body 200 further increases, which enables the first moving body 100 to safely cross further behind the second moving body 200. When the difference between the first arrival time period and the second arrival time period is small, the first moving body 100 takes a detour and travels in a direction that is angled by a larger degree with respect to the direction in which the first moving body 100 travels before taking the detour. As a result, the distance between the first moving body 100, when crossing the movement path of the second moving body 200, and the second moving body 200 further increases, which enables the first moving body 100 to safely cross further behind the second moving body 200.

When the first arrival time period is more than the second arrival time period, the first arrival time period may be more than a time period obtained by adding a predetermined time period to the second arrival time period. For example, when the first arrival time period is more than the second arrival time period, a period of M seconds may be more than a period of (N+n+a) seconds, where a denotes a predetermined time period. As a result, the distance between the first moving body 100, when crossing the movement path of the second moving body 200, and the second moving body 200 increases by an amount corresponding to the predetermined time period, which enables the first moving body 100 to safely cross further behind the second moving body 200.

If the determination unit 30 does not determine that the first arrival time period is more than the second arrival time period (No in step S23), that is, if the first arrival time period and the second arrival time period are determined to be equal, the generation unit 40 generates travel assistance information including information for directing the first moving body 100 to decelerate or stop (step S25), and the output unit 50 outputs the travel assistance information.

The expression "the first arrival time period and the second arrival time period are equal" is used to include not only the case in which the first arrival time period and the second arrival time period are completely equal but also the case in which the first arrival time period and the second arrival time period are substantially equal. Specifically, when the first arrival time period and the second arrival time period are equal, this means that the difference between the first arrival time period and the second arrival time period is less than or equal to a predetermined threshold. For example, if the predetermined threshold is n seconds, that is, if a period of M seconds as the first arrival time period is greater than or equal to a period of N seconds and less than or equal to a period of (N+n) seconds as the second arrival time period, the first arrival time period and the second arrival time period are determined to be equal. For example, if the predetermined threshold is m seconds, that is, if a period of N seconds as the second arrival time period is greater than or equal to a period of M seconds and less than or equal to a period of (M+m) seconds as the first arrival time period, the first arrival time period and the second arrival time period are determined to be equal. When a period of M seconds is greater than or equal to a period of N seconds and less than or equal to a period of (N+n) seconds, this means that the first moving body 100 reaches the path intersecting position when the second moving body 200 is passing through the path intersecting position (when any portion in the range from the front end to the rear end of the second moving body 200 is at the path intersecting position). That is, when a period of M seconds is greater than or equal to a period of N seconds and less than or equal to a period of (N+n) seconds, this means that the first moving body 100 may collide with the side of the second moving body 200. When a period of N seconds is greater than or equal to a period of M seconds and less than or equal to a period of (M+m) seconds, this means that the second moving body 200 reaches the path intersecting position when the first moving body 100 is passing through the path intersecting position (when any portion in the range from the front end to the rear end of the first moving body 100 is at the path intersecting position). That is, if a period of N seconds is greater than or equal to a period of M seconds and less than or equal to a period of (M+m) seconds, this means that the second moving body 200 may collide with the side of the first moving body 100.

Figure 8:
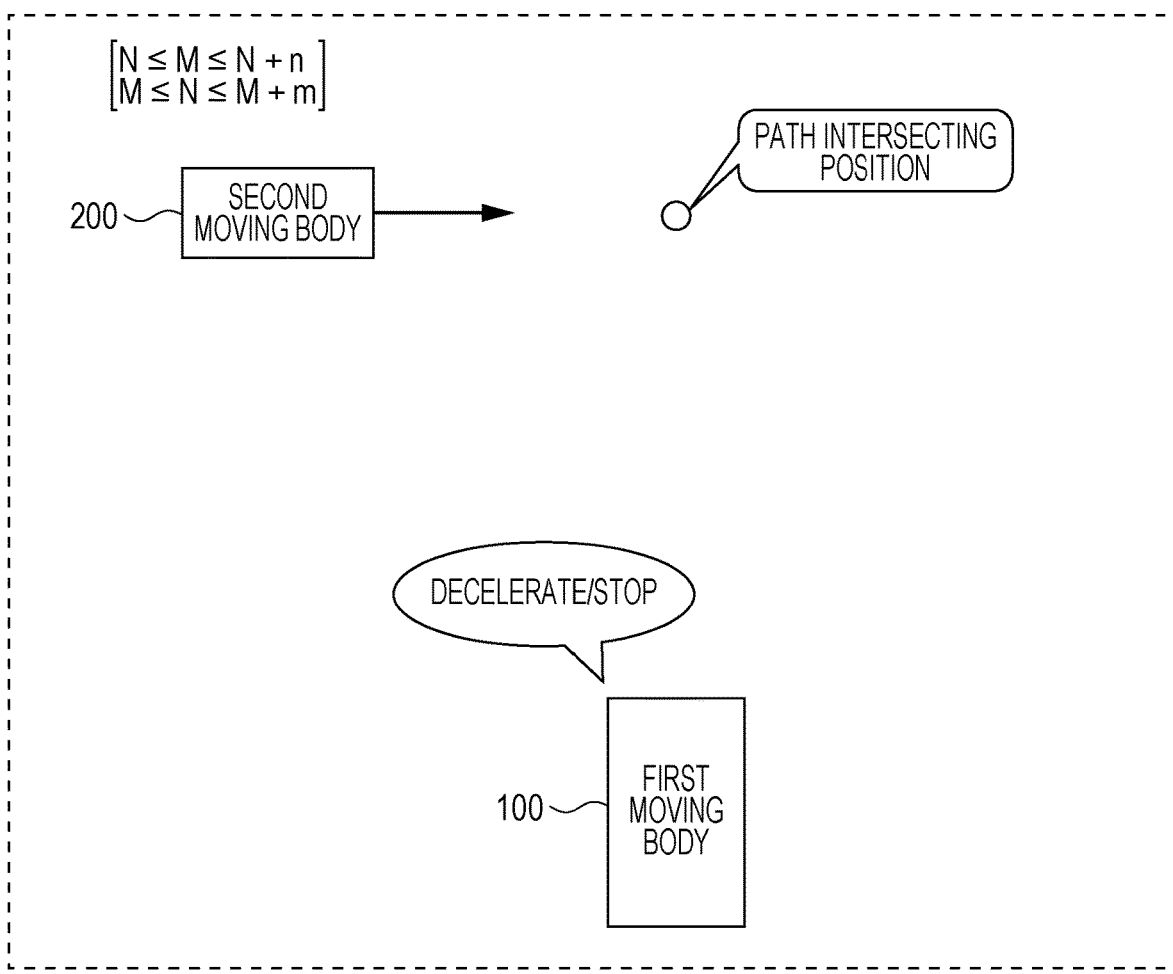
FIG. 8 is a diagram illustrating an example of collision avoidance when the first arrival time period and the second arrival time period are equal.

FIG. 8 is a diagram illustrating an example of collision avoidance when the first arrival time period and the second arrival time period are equal.

If the determination unit 30 determines that the first arrival time period and the second arrival time period are equal, the first moving body 100 and the second moving body 200 may collide with each other (the first moving body 100 may collide with the second moving body 200 or the second moving body 200 may collide with the first moving body 100). Thus, as illustrated in FIG. 8, the first moving body 100 decelerates or stops on the basis of the travel assistance information output from the output unit 50 and is thus able to avoid collision. In this way, when the first arrival time period and the second arrival time period are equal, the first moving body 100 decelerates or stops. In other words, when the first arrival time period is less than or more than the second arrival time period, the first moving body 100 can appropriately avoid collision while preventing deceleration or stopping.

The processing of steps S11 to S14 is repeatedly performed. For example, after, in response to the determination unit 30 determining that the first arrival time period is less than the second arrival time period, the first moving body 100 has started to take a detour and travel in the direction of movement of the second moving body 200, the second moving body 200 decelerates and as a result the first arrival time period becomes more than the second arrival time period. In this case, the determination unit 30 re-determines that the first arrival time period is more than the second arrival time period, and the first moving body 100 takes a detour and travels in a direction opposite to the direction of movement of the second moving body 200. For example, after, in response to the determination unit 30 determining that the first arrival time period is more than the second arrival time period, the first moving body 100 has started to take a detour and travel in a direction opposite to the direction of movement of the second moving body 200, the second moving body 200 accelerates and as a result the first arrival time period becomes less than the second arrival time period. In this case, the determination unit 30 re-determines that the first arrival time period is less than the second arrival time period, and the first moving body 100 takes a detour and travels in the direction of movement of the second moving body 200.

In this way, even if the first movement information and the second movement information are changed, a process for avoiding collision is performed in sequence in accordance with the change in the first movement information and the second movement information.

As illustrated in FIG. 1 and other figures, a substantially right angle is formed between the direction of movement of the first moving body 100 and the direction of movement of the second moving body 200, by way of example but not limitation.

Figure 9:
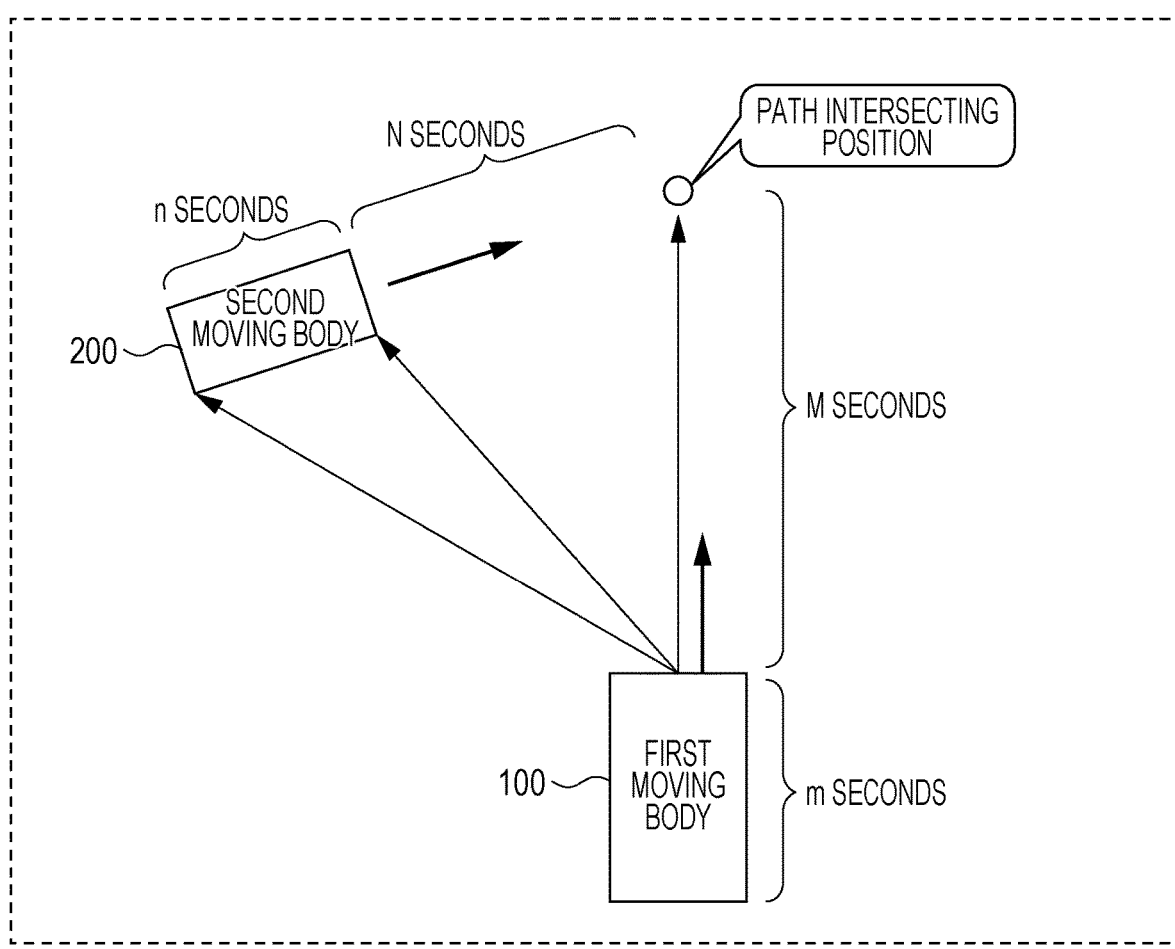
FIG. 9 is a diagram illustrating another situation in which the predicted movement path of the first moving body and the predicted movement path of the second moving body intersect.

FIG. 9 is a diagram illustrating another situation in which the predicted movement path of the first moving body 100 and the predicted movement path of the second moving body 200 intersect. As illustrated in FIG. 9, an acute angle may be formed between the direction of movement of the first moving body 100 and the direction of movement of the second moving body 200. Also in this case, the obtaining unit 20 can obtain the second movement information from information obtained by a camera or a LIDAR device or the like and can obtain the first arrival time period (such as M or m seconds) and the second arrival time period (such as N or n seconds) from the first movement information and the second movement information. In accordance with the relationship between the obtained first arrival time period and second arrival time period, the first moving body 100 can appropriately avoid collision while preventing deceleration or stopping.

When the recognition unit 60 recognizes the attributes of the second moving body 200, an operation may be performed in accordance with the recognized attributes. For instance, the second moving body 200 is an elderly person. Elderly people are likely to move slowly and are less likely to move quickly all of a sudden. Therefore, the amount of acceleration that the first moving body 100 experiences to take a detour and travel in the direction of movement of the elderly person may be reduced. For instance, the second moving body 200 is a child. Children are likely to move quickly and may sometimes move at suddenly changing speeds. Therefore, the amount of deceleration that the first moving body 100 experiences to take a detour and travel in a direction opposite to the direction of movement of the child may be increased.

1-3. Advantages, etc.

As described above, the first moving body 100 takes a detour from the first predicted path and travels in a direction corresponding to a difference between arrival time periods taken for the first moving body 100 and the second moving body 200 to reach an intersection point of a second predicted path determined from the second movement information and a first predicted path determined from the first movement information (the path intersecting position) to avoid collision. In accordance with the difference between the arrival time periods, the first moving body 100 crosses the path in the direction of movement of the second moving body 200 (ahead of the second moving body 200) or the path in the opposite direction (behind the second moving body 200). As a result, the distance between the first moving body 100, when crossing the movement path of the second moving body 200, and the second moving body 200 increases, which enables the first moving body 100 to safely avoid collision without decelerating or stopping. Accordingly, it may be possible to prevent or minimize a reduction in the evaluation of operations of a moving body while allowing the moving body to avoid collision.

Second Embodiment

A second embodiment will be described with reference to FIGS. 10 and 11. In the first embodiment, a description has been given of a situation in which the predicted movement path of the first moving body 100 and a predicted movement path of a single moving body, namely, the second moving body 200, intersect. In the second embodiment, a description will be given of a situation in which the predicted movement path of the first moving body 100 and predicted movement paths of a plurality of moving bodies intersect. In the presence of a plurality of moving bodies with which a subject moving body desires to avoid collision, in the related art, the subject moving body performs a decelerating or stopping process for each moving body, which may inhibit the subject moving body from proceeding. However, in the information processing apparatus 10 according to this embodiment, deceleration or stopping may be prevented or minimized even in the presence of a plurality of moving bodies. The configuration of the information processing apparatus 10 according to the second embodiment is the same or substantially the same as that according to the first embodiment and is not described herein.

Figure 10:
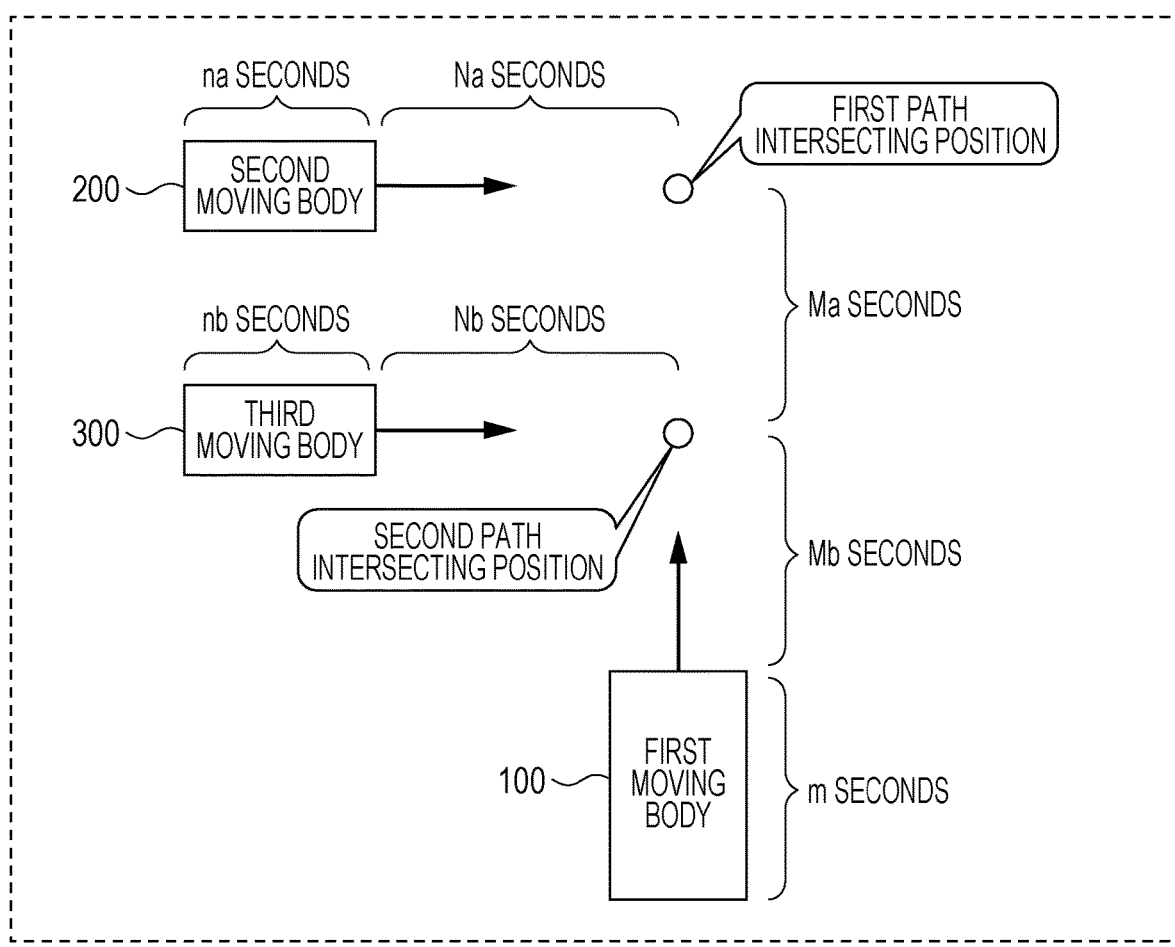
FIG. 10 is a diagram illustrating a situation in which the predicted movement path of the first moving body and predicted movement paths of a plurality of moving bodies intersect.

FIG. 10 is a diagram illustrating a situation in which the predicted movement path of the first moving body 100 and predicted movement paths of a plurality of moving bodies intersect. A plurality of moving bodies (here, a second moving body 200 and a third moving body 300, for example) are moving from the left side ahead (in the direction of movement) of the first moving body 100 and approaching the path of travel of the first moving body 100. If the first moving body 100, the second moving body 200, and the third moving body 300 move while keeping their current directions of movement, the first moving body 100 may collide with the third moving body 300 and the second moving body 200.

The operation of the information processing apparatus 10 in the situation described above will be described hereinbelow.

The recognition unit 60 recognizes the presence of the second moving body 200 and the third moving body 300. The recognition unit 60 recognizes each moving body by using the same or substantially the same method as that in the first embodiment, which is not described herein.

Then, the obtaining unit 20 obtains the first movement information, the second movement information, and third movement information. The third movement information includes the position and velocity of the third moving body 300. The obtaining unit 20 obtains each piece of movement information by using the same or substantially the same method as that in the first embodiment, which is not described herein.

The obtaining unit 20 further obtains a time period (referred to as a second arrival time period) taken for the second moving body 200 to reach an intersection point (a first path intersecting position) of a second predicted path determined from the second movement information and a first predicted path determined from the first movement information and a time period (referred to as a first arrival time period) taken for the first moving body 100 to reach the first path intersecting position. The obtaining unit 20 also obtains a time period (referred to as a third arrival time period) taken for the third moving body 300 to reach an intersection point (a second path intersecting position) of a third predicted path determined from the third movement information and the first predicted path determined from the first movement information and a time period (referred to as a fourth arrival time period) taken for the first moving body 100 to reach the second path intersecting position. The obtaining unit 20 obtains each arrival time period by using the same or substantially the same method as that in the first embodiment, which is not described herein. The first arrival time period may be (Ma+Mb) seconds or (Ma+Mb+m) seconds illustrated in FIG. 10. The second arrival time period may be Na seconds or (Na+na) seconds illustrated in FIG. 10. The third arrival time period may be Nb seconds or (Nb+nb) seconds illustrated in FIG. 10. The fourth arrival time period may be Mb seconds or (Mb+m) seconds illustrated in FIG. 10.

Then, the generation unit 40 generates travel assistance information including information for directing the first moving body 100 to take a detour from the first predicted path and travel in a direction corresponding to a difference between the arrival time periods taken for the third moving body 300 and the first moving body 100 to reach the second path intersecting position, and the output unit 50 outputs the generated travel assistance information. At this time, the generation unit 40 also generates information for directing the first moving body 100 to take a detour and travel in a direction corresponding to a difference between the arrival time periods taken for the second moving body 200 and the first moving body 100 to reach the first path intersecting position. The output unit 50 first outputs travel assistance information for avoiding collision with the third moving body 300 just ahead of the first moving body 100 and then outputs or does not output information for avoiding collision with the second moving body 200, which is farther ahead of the first moving body 100, depending on the subsequent situation. This will be described specifically hereinbelow.

The determination unit 30 determines whether the fourth arrival time period is less than the third arrival time period. For example, the determination unit 30 determines whether a period of (Mb+m) seconds as the fourth arrival time period is less than a period of Nb seconds as the third arrival time period. The determination unit 30 further determines whether the first arrival time period is less than the second arrival time period. For example, the determination unit 30 determines whether a period of (Ma+Mb+m) seconds as the first arrival time period is less than a period of Na seconds as the second arrival time period.

If the determination unit 30 determines that the fourth arrival time period is less than the third arrival time period, the generation unit 40 generates travel assistance information including information for directing the first moving body 100 to take a detour and travel in the direction of movement of the third moving body 300 as the direction corresponding to the difference between the arrival time periods at a speed that is increased compared with the speed of the first moving body 100 before taking the detour, and the output unit 50 outputs the travel assistance information. If the determination unit 30 determines that the first arrival time period is less than the second arrival time period, the generation unit 40 generates information for directing the first moving body 100 to take a detour and travel in the direction of movement of the second moving body 200 as the direction corresponding to the difference between the arrival time periods at a speed that is increased compared with the speed of the first moving body 100 before taking the detour.

If the determination unit 30 does not determine that the fourth arrival time period is less than the third arrival time period, the determination unit 30 determines whether the fourth arrival time period is more than the third arrival time period. For example, the determination unit 30 determines whether a period of Mb seconds as the fourth arrival time period is more than a period of (Nb+nb) seconds as the third arrival time period. If the determination unit 30 does not determine that the first arrival time period is less than the second arrival time period, the determination unit 30 determines whether the first arrival time period is more than the second arrival time period. For example, the determination unit 30 determines whether a period of (Ma+Mb) seconds as the first arrival time period is more than a period of (Na+na) seconds as the second arrival time period.

If the determination unit 30 determines that the fourth arrival time period is more than the third arrival time period, the generation unit 40 generates travel assistance information including information for directing the first moving body 100 to take a detour and travel in a direction opposite to the direction of movement of the third moving body 300 as the direction corresponding to the difference between the arrival time periods at a speed that is decreased compared with the speed of the first moving body 100 before taking the detour, and the output unit 50 outputs the travel assistance information. If the determination unit 30 determines that the first arrival time period is more than the second arrival time period, the generation unit 40 generates information for directing the first moving body 100 to take a detour and travel in a direction opposite to the direction of movement of the second moving body 200 as the direction corresponding to the difference between the arrival time periods at a speed that is decreased compared with the speed of the first moving body 100 before taking the detour.

If the determination unit 30 does not determine that the fourth arrival time period is more than the third arrival time period, that is, if the fourth arrival time period and the third arrival time period are determined to be equal, the generation unit 40 generates travel assistance information including information for directing the first moving body 100 to decelerate or stop, and the output unit 50 outputs the travel assistance information. If the determination unit 30 does not determine that the first arrival time period is more than the second arrival time period, that is, if the first arrival time period and the second arrival time period are determined to be equal, the generation unit 40 generates information for directing the first moving body 100 to decelerate or stop.

For example, each piece of movement information is obtained based on an image obtained from a camera. In this case, if the camera has a low frame rate, the number of times determination can be made by the determination unit 30 per unit time is small. Thus, for example, if determination of whether the collision with the second moving body 200 is avoidable is performed after the first moving body 100 has avoided the collision with the third moving body 300, the determination of whether the collision with the second moving body 200 is avoidable may be delayed. To address this situation, when generating travel assistance information for avoiding collision between the first moving body 100 and the third moving body 300, the generation unit 40 also generates information for avoiding collision between the first moving body 100 and the second moving body 200 in advance. If the determination of whether the collision with the second moving body 200 is avoidable is not performed immediately after collision between the first moving body 100 and the third moving body 300 has been avoided because of the low frame rate of the camera, the information for avoiding collision with the second moving body 200, which is generated in advance, is output. If the determination of whether the collision with the second moving body 200 is avoidable is performed immediately after collision between the first moving body 100 and the third moving body 300 has been avoided because of the high frame rate of the camera, latest information for avoiding collision with the second moving body 200 is output.

Figure 11:
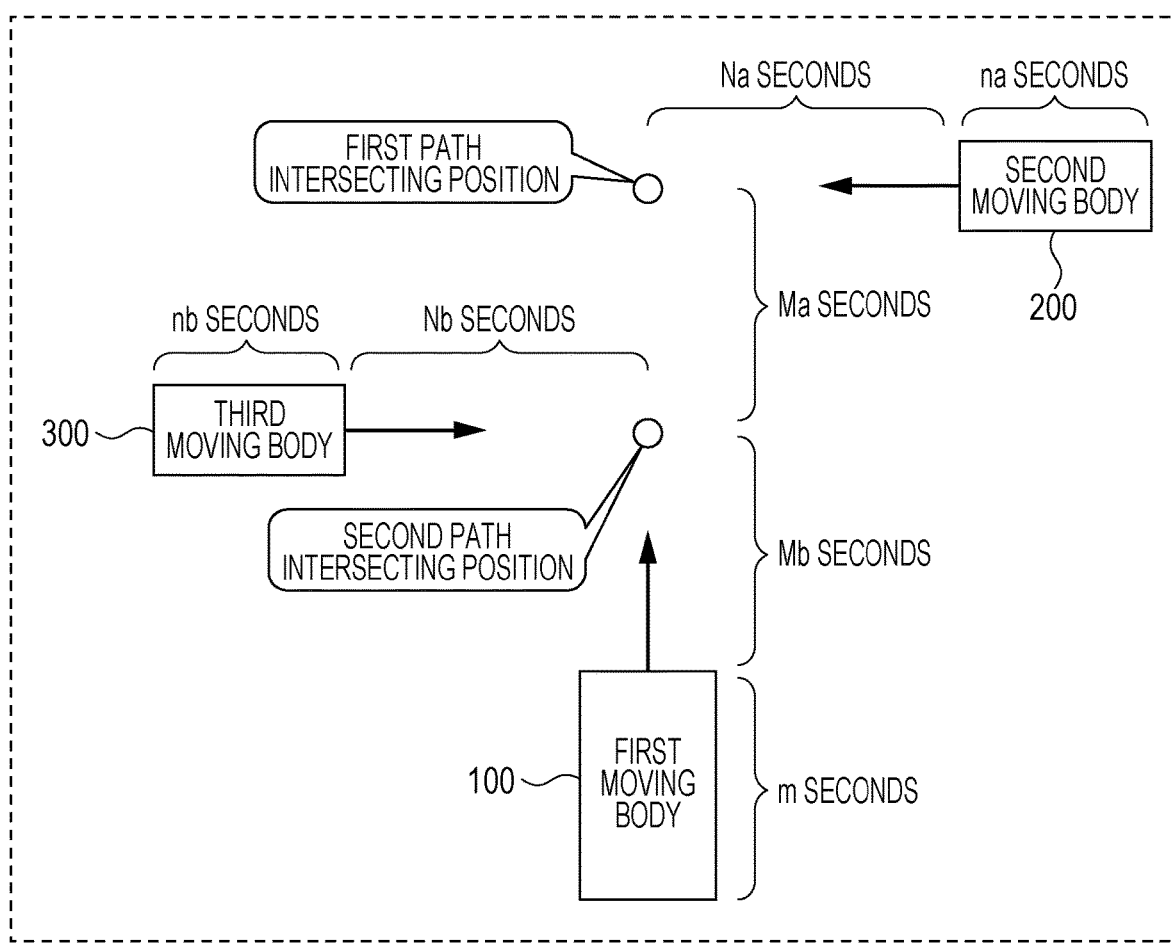
FIG. 11 is a diagram illustrating another situation in which the predicted movement path of the first moving body and predicted movement paths of a plurality of moving bodies intersect.

As illustrated in FIG. 11, a plurality of moving bodies (here, a second moving body 200 and a third moving body 300, for example) are approaching from multiple directions such as from the left and right sides ahead (in the direction of movement) of the first moving body 100. If the first moving body 100, the second moving body 200, and the third moving body 300 move while keeping their current directions of movement, the first moving body 100 may collide with the third moving body 300 and the second moving body 200. Even in this situation, the same or substantially the same process as that described above with reference to FIG. 10 is performed.

As described above, after the first moving body 100 has avoided collision with a moving body just ahead of the first moving body 100 (for example, the third moving body 300), determination of whether collision with a moving body farther ahead of the first moving body 100 (for example, the second moving body 200) is avoidable may be delayed depending on the frame rate of the camera. However, when performing determination of whether collision with a moving body that is just ahead of the first moving body 100 is avoidable, the first moving body 100 also performs in advance determination of whether collision with a moving body that is farther ahead of the first moving body 100 is avoidable, which enables the first moving body 100 to safely avoid collision even with a camera having a low frame rate.

Other Embodiments

While the information processing apparatus 10 according to the first and second embodiments of the present disclosure has been described, the present disclosure is not limited to these embodiments. Various modifications conceivable by a person skilled in the art to these embodiments and embodiments achieved by combining constituent elements in different embodiments also fall within the scope of the present disclosure without departing from the spirit and scope of the present disclosure.

For example, in the embodiments described above, the travel assistance information includes information for directing the first moving body 100 to make a detour and travel at a speed corresponding to a difference in arrival time period. Alternatively, the travel assistance information may not necessarily include such information. For example, when the first arrival time period is less than the second arrival time period, the travel assistance information may include information for directing the first moving body 100 to take a detour and travel in the direction of movement of the second moving body 200 as the direction corresponding to the difference in arrival time period at a speed equal to the speed of the first moving body 100 before taking the detour. Likewise, when the first arrival time period is more than the second arrival time period, the travel assistance information may include information for directing the first moving body 100 to take a detour and travel in a direction opposite to the direction of movement of the second moving body 200 as the direction corresponding to the difference in arrival time period at a speed equal to the speed of the first moving body 100 before taking the detour.

In the embodiments described above, furthermore, the obtaining unit 20 obtains the first arrival time period and the second arrival time period, by way of example but not limitation. The distance between the first moving body 100 and the path intersecting position and the velocity of the first moving body 100 can be converted into the first arrival time period, and the distance between the second moving body 200 and the path intersecting position and the velocity of the second moving body 200 can be converted into the second arrival time period. Thus, the obtaining unit 20 may not necessarily obtain the first arrival time period or the second arrival time period if the obtaining unit 20 obtains the distances and velocities.

In the embodiments described above, furthermore, for example, the travel assistance information is information for controlling the travel of the first moving body 100. Alternatively, the travel assistance information may be information for informing the passenger(s) of the first moving body 100 of how the travel of the first moving body 100 is controlled. For example, the information includes either image (text) information or audio information, or both to indicate how the travel of the first moving body 100 is controlled. When the first moving body 100 is a manual driving vehicle, the passenger (driver) of the first moving body 100 can be notified whether to take a detour by turning right or left to avoid collision. When the first moving body 100 is an automatic driving vehicle, the passenger(s) of the first moving body 100 can be notified whether the first moving body 100 is to turn right or left to take a detour. The notification is performed by using, for example, a display, speakers, or any other suitable device included in the first moving body 100.

An embodiment of the present disclosure may be implemented not only as an information processing apparatus but also as a method including steps (processes) performed by constituent elements of the information processing apparatus.

The steps may be executed by a computer (computer system), for example. An embodiment of the present disclosure may be implemented as a program for causing the computer to execute the steps included in the method. An embodiment of the present disclosure may also be implemented as a non-transitory computer-readable recording medium storing the program, such as a compact disc read-only memory (CD-ROM).

For example, when an embodiment of the present disclosure is implemented as a program (software), the program is executed by using hardware resources of the computer, such as a central processing unit (CPU), a memory, and an input/output circuit, and the steps are executed accordingly. That is, the CPU obtains data from the memory, the input/output circuit, or the like for calculation and outputs the result of the calculation to the memory, the input/output circuit, or the like, and the steps are executed accordingly.

The plurality of constituent elements included in the information processing apparatus according to the embodiments described above may be each implemented as a specific or general-purpose circuit. These constituent elements may be implemented as a single circuit or as a plurality of circuits.

The plurality of constituent elements included in the information processing apparatus according to the embodiments described above may be implemented as a large scale integration (LSI) circuit that is an integrated circuit (IC). These constituent elements may be formed as individual chips or some or all of the constituent elements may be integrated into a single chip. LSI may be called system LSI, super LSI, or ultra LSI depending on the degree of integration.

In addition, an integrated circuit may be implemented by a dedicated circuit or a general-purpose processor instead of by LSI. A field programmable gate array (FPGA) that is programmable or a reconfigurable processor in which the connection or setting of circuit cells in the LSI is reconfigurable may be used.

Other embodiments, such as embodiments achieved by making various modifications conceivable by a person skilled in the art to the embodiments or embodiments achieved by any combination of constituent elements and functions in the embodiments without departing from the spirit and scope of the present disclosure, are also included in the present disclosure.

The present disclosure is applicable to an automatic driving vehicle, for example.

What is claimed is:
1. An apparatus which is equipped in a first moving body, the apparatus comprising:
    a processor;
    a sensor; and
    a memory storing a computer program, which when executed by the processor, causes the processor to perform operations including:

obtaining first movement information and second movement information using the sensor, the second movement information including a position and velocity of a second moving body, the first movement information including a position and velocity of the first moving body;

generating travel assistance information including information for directing the first moving body to take a detour from a first predicted path in accordance with a difference between a first arrival time period and a second arrival time period, the first arrival time period being an arrival time period taken for the second moving body to reach an intersection point of a second predicted path and the first predicted path, the second arrival time period being an arrival time period taken for the first moving body to reach the intersection point, the first predicted path being determined from the first movement information, the second predicted path being determined from the second movement information; and outputting the generated travel assistance information to the first moving body, to direct the first moving body to take the detour from the first predicted path.

2. The apparatus according to claim 1, wherein the information for directing the first moving body to take the detour includes information for directing the first moving body to take a detour in a direction of movement of the second moving body, when the first arrival time period is less than the second arrival time period.

3. The apparatus according to claim 2, wherein the information for directing the first moving body to take the detour includes information for directing the first moving body to take a detour in a direction opposite to the direction of movement of the second moving body, when the first arrival time period is more than the second arrival time period.

4. The apparatus according to claim 3, wherein the information for directing the first moving body to take the detour includes information for directing the first moving body to take a detour at a speed corresponding to the difference between the first arrival time period and the second arrival time period.

5. The apparatus according to claim 4, wherein the speed corresponding to the difference between the first arrival time period and the second arrival time period is a speed that is increased or decreased by the difference between the first arrival time period and the second arrival time period compared with a speed of the first moving body before the first moving body takes the detour.

6. The apparatus according to claim 1, wherein the travel assistance information further includes information for directing the first moving body to decelerate or stop when the difference between the first arrival time period and the second arrival time period is less than or equal to a predetermined threshold.

7. The apparatus according to claim 1, wherein the travel assistance information includes information for controlling travel of the first moving body.

8. The apparatus according to claim 1, wherein the travel assistance information includes information for informing a passenger of the first moving body of how travel of the first moving body is controlled.

9. The apparatus according to claim 1, wherein the information for directing the first moving body to take the detour includes information for directing the first moving body to travel in a direction that is angled by an amount corresponding to the difference between the first arrival time period and the second arrival time period with respect to a direction in which the first moving body travels before taking the detour.

10. A non-transitory recording medium storing a computer program for controlling an apparatus equipped in a first moving body, which when executed by a processor, causes the processor to perform operations including:

obtaining first movement information and second movement information using a sensor, the second movement information including a position and velocity of a second moving body, the first movement information including a position and velocity of the first moving body;

generating travel assistance information including information for directing the first moving body to take a detour from a first predicted path in accordance with a difference between a first arrival time period and a second arrival time period, the first arrival time period being an arrival time period taken for the second moving body to reach an intersection point of a second predicted path and the first predicted path, the second arrival time period being an arrival time period taken for the first moving body to reach the intersection point, the first predicted path being determined from the first movement information, the second predicted path being determined from the second movement information; and outputting the generated travel assistance information to the first moving body, to direct the first moving body to take the detour from the first predicted path.

11. A method for controlling an apparatus equipped in a first moving body, the method comprising:

obtaining first movement information and second movement information using a sensor, the second movement information including a position and velocity of a second moving body, the first movement information including a position and velocity of the first moving body;

generating travel assistance information including information for directing the first moving body to take a detour from a first predicted path in accordance with a difference between a first arrival time period and a second arrival time period, the first arrival time period being an arrival time period taken for the second moving body to reach an intersection point of a second predicted path, the second arrival time period being the first predicted path and an arrival time period taken for the first moving body to reach the intersection point, the first predicted path being determined from the first movement information, the second predicted path being determined from the second movement information; and outputting the generated travel assistance information to the first moving body, to direct the first moving body to take the detour from the first predicted path.

* * * * *